(12) United States Patent
Collard et al.

(10) Patent No.: US 12,732,512 B1
(45) Date of Patent: Sep. 8, 2026

(54) NETWORK THREAT DETERMINATION BY A MODEL

(71) Applicant: Amazon Technologies, Inc., Seattle, WA (US)

(72) Inventors: Patrick Collard, Arlington, VA (US); Wayne Alan Fullen, Falls Church, VA (US); Evripidis Paraskevas, Washington DC, DC (US); Catherine Watkins, Minneapolis, MN (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 18/372,639

(22) Filed: Sep. 25, 2023

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01)

(58) Field of Classification Search
CPC ............ H04L 61/4511; H04L 63/1416; H04L 63/1408; H04L 63/1433; H04L 43/04; H04L 63/1425; H04L 63/1458; H04L 43/0894; H04L 63/1466; H04L 43/18; H04L 47/10; H04L 43/026; H04L 63/1441; H04N 21/2393; H04N 21/4331; H04N 21/4532; H04N 21/6581; H04N 21/23106; H04N 21/8456; H04N 21/4826; H04N 21/4668; H04N 21/222; H04N 21/44; H04N 21/23103
See application file for complete search history.

(56) References Cited

U.S. PATENT DOCUMENTS

| | | | | |
|---|---|---|---|---|
| 11,323,350 B2 * | 5/2022 | Aybay | ................. | H04L 63/1408 |
| 2021/0021905 A1 * | 1/2021 | Li | ...................... | H04N 21/2393 |
| 2023/0420147 A1 * | 12/2023 | Baker | ................. | H04L 61/4511 |

* cited by examiner

*Primary Examiner* — Kyung H Shin
(74) *Attorney, Agent, or Firm* — Eversheds Sutherland (US) LLP

(57) ABSTRACT

Techniques for a service provider network to identify malicious activity associated with a client device or service are discussed herein. A system can analyze network data and identify a device or service vulnerable to exploitation, disruption, data theft, and the like, by a threat actor operating as the IP address. In some examples, the system can determine a state for the network data based on a number of accounts and/or an amount or rate of new accounts accessed by the IP address over a time period. The system can compare states representing network activity by the IP address for different times and output an indication of the potential malicious event based on the compared states revealing a number of new resources accessed by the IP address meets or exceeds a threshold value.

18 Claims, 7 Drawing Sheets

200
Service Provider Network 102
Query System 212
Services 108
Computing Device(s) 110
Model Component 202
First Model 216A
Second Model 216B
Third Model 216C
Nth - Model 216N
Training Component 218
Threat Determination Component 112
Aggregation Component 204
Analysis Component 206
State Determination Component 208
Message Component 210
Data 120
Network(s) 118
Data 120
Threat Data 220
User(s) 106
Client Device(s) 104
Threat Actor 214

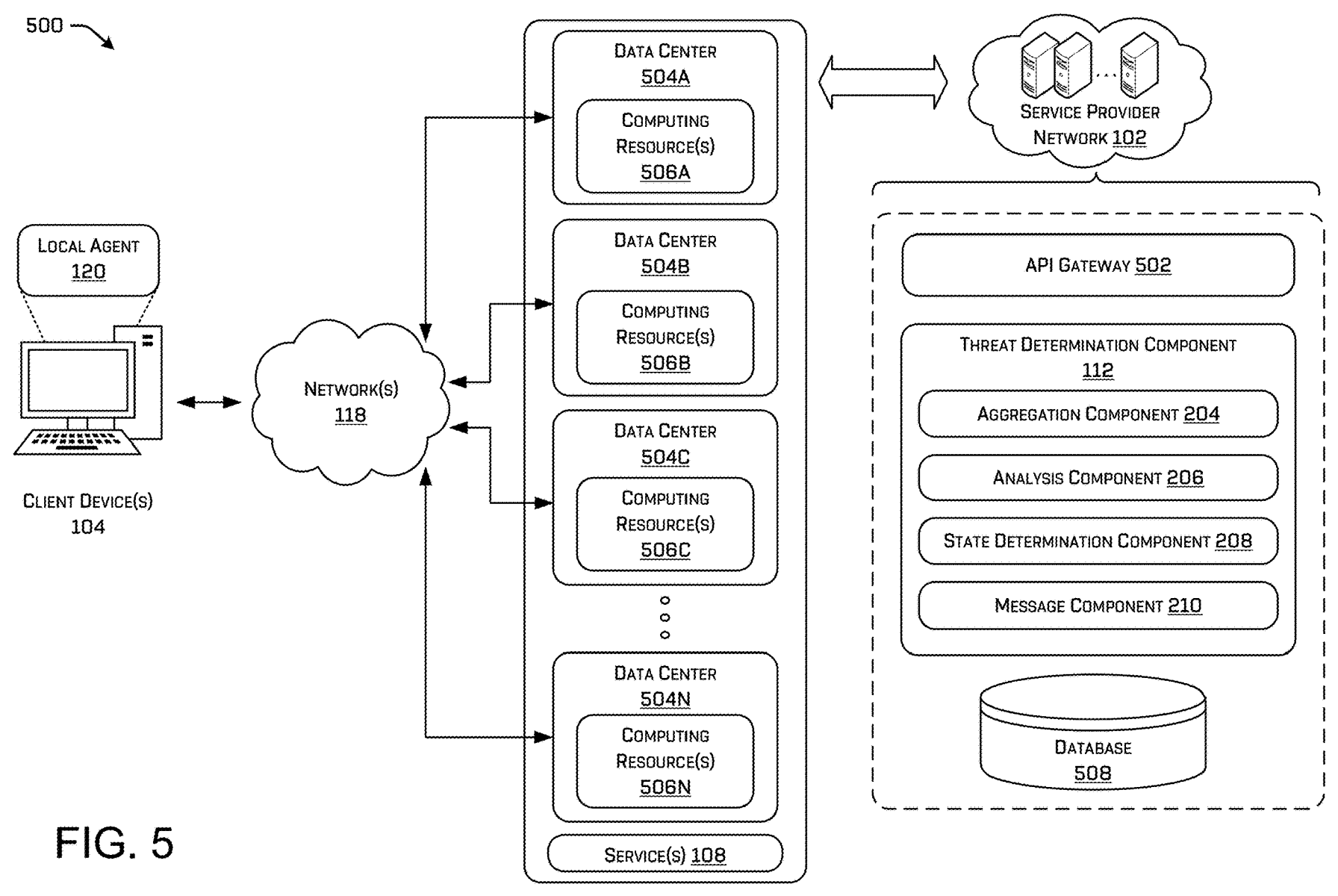

500

Service Provider Network 102

API Gateway 502

Threat Determination Component 112

Aggregation Component 204

Analysis Component 206

State Determination Component 208

Message Component 210

Database 508

Data Center 504A

Computing Resource(s) 506A

Data Center 504B

Computing Resource(s) 506B

Data Center 504C

Computing Resource(s) 506C

Data Center 504N

Computing Resource(s) 506N

Service(s) 108

Network(s) 118

Local Agent 120

Client Device(s) 104

FIG. 5

NETWORK THREAT DETERMINATION BY A MODEL

BACKGROUND

Cloud-based computing environments may provide many different types of services to subscribers, such as on-demand computing services, data-management services, software-execution services, application-hosting services, and various other types of services. Due to the ease of having the serverless computing environment provide and manage the computing infrastructure on behalf of subscribers, users continue to utilize cloud-based networks to provide and/or host services that are accessible over the Internet.

Some services may detect unauthorized intrusions to a customer account over the Internet. A service may be employed to mitigate security exploits and cyberattacks directed to stealing and destroying computer resources, data, and private information. Some attacks are carried out using "malware", or malicious software. "Malware" refers to a variety of forms of hostile or intrusive computer programs that can disrupt computer operations or access sensitive information stored on a computer (e.g., viruses, worms, Trojan horses, ransomware, and the like). Malware is increasingly disguised in an effort to avoid detection making it time-consuming and resource-intensive to attempt to detect malicious behavior caused by such malware.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a system and network diagram of an example operating environment that includes a service provider network for implementing the techniques described herein.

DETAILED DESCRIPTION

Figure 1:
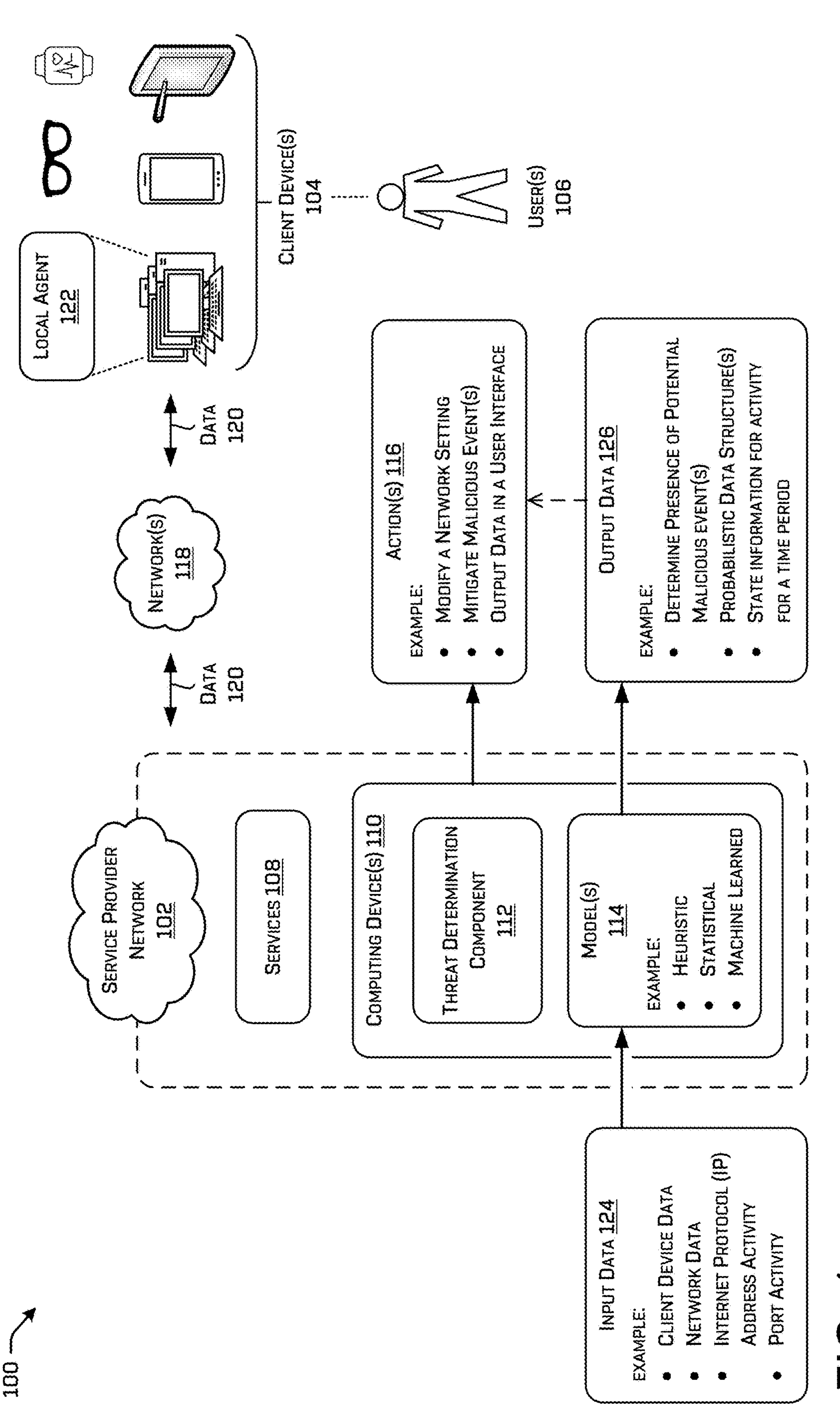
FIG. 1 illustrates a system-architecture diagram of an example environment for detecting and mitigating potential threats associated with a service provider network.

This disclosure relates to techniques for automatically detecting malicious behavior by an internet protocol (IP) address in a cloud computing environment. A service provider network can implement a system to analyze network data and identify a device or service vulnerable to exploitation, disruption, data theft, and the like, by a threat actor operating as the IP address. The system can determine a state for the network data based on a number of accounts and/or an amount or rate of new accounts accessed by the IP address over a time period. The system can compare states representing network activity by the IP address for different times and output an indication of a potential threat (e.g., a potential malicious event, etc.) based on the compared states revealing a number of new resources accessed by the IP address that meets or exceeds a threshold value. The system can, in various examples, determine an action to remedy the potential threat (e.g., identify a defense strategy, modify a network setting, and so on). The system can also or instead identify a false indication of threat and take no action (e.g., detect false positives). By determining and comparing states associated with different times as discussed herein, the system can proactively identify changes in network activity representing a potential impact to a computing device using the service provider network.

Generally, the techniques can include detecting presence of a scanner (or other threat actor) independent of an attack type used by the scanner and/or a frequency of attacks by the scanner. For example, a scanner implementing a brute-force attack type may be identified by the system analyzing network data gathered over a first time frame while the scanner implementing a password guessing attack type can be detected based on the network data being associated with a second time period different from the first time period (e.g., a shorter timeframe sufficient to detect the password guessing attack type). By capturing network data over different lengths times, the system can optionally analyze relatively shorter and/or longer periods of time to identify patterns exhibited by different types of data attacks.

In various examples, the system can analyze network data associated with different time frames and store a state value to represent one or more of: a number of user accounts accessed by the IP address over a single time period or multiple time periods, a number of new accounts accessed by the IP address for a given time period and/or compared to a previous time, or a resource(s) accessed by the IP address for the given time period, just to name a few. The system can, in some examples, store the state value to enable a low memory footprint of network activity for the particular time period (as compared to storing all IP address activity for the time period). In some examples, state values from different time periods can be compared one to another to identify a rate at which the IP address accesses a resource for a first instance (e.g., occurrences of accessing a new resource). The determined rate can be used by the system in a variety of ways including but not limited to determining whether to classify a portion of the network activity as a potential malicious event and/or adjusting a future time period for network data (e.g., determine a length or amount of network data sufficient for identifying different attack types initiated by a threat actor).

In some examples, the system can represent a streaming analytics service that is configured to detect a threat actor accessing a storage device, computing device, network, a user account, etc. associated with one or more services provided in association with the service provider network. For example, the system can comprise a computing device configured to sample, gather, aggregate or otherwise receive data representing network activity associated with the service provider network. In various examples, the computing device can implement a model or component to track activity by one or more IP addresses over the service provider network to ensure that data exchanged in association with such services are free of malicious behavior by the threat actor. The computing device can, for example, analyze the network data to identify a pattern of network activity by an IP address over time, such as how often the IP address accesses a resource, a number of user accounts, types of resources accessed, and the like. The pattern of network activity may also or instead indicate a number of new resources (e.g., new user accounts, etc.) accessed during a given time period or a rate at which the IP address accesses a new resource (e.g., a new user account, memory location, file, etc.).

In various examples, a model or component can periodically receive new data (e.g., receive a new dataset representing network activity over a time period) and identify changes in the data processed by a service, a client device, or other computing device (e.g., associated with different user accounts). For example, the model can receive network data corresponding to network activity for various one minute intervals (or another interval(s)) to continuously monitor a service for a threat actor. The change in network activity can, for example, represent whether or not a particular IP address accesses a same or different number of resources relative to a previous time period and/or whether a new resource(s) is accessed during the second time period relative to the first time period. By identifying changes in network behavior over time, the model can determine to classify some network activity as a potential malicious event associated with a threat actor. By implementing the techniques described herein, a service can provide data (e.g., content) safely and securely over a network to improve a customer experience (e.g., pre-emptively identify threats to a service or device, reduce false positive messages resulting in unneeded time and attention for non-threats, etc.).

By way of example and not limitation, a service can provide a live event (e.g., data representing a real-world event taking place in real-time) to various devices via the service provider network and one or more third-party networks (e.g., an Internet provider). The service provider network may comprise clusters of managed servers stored in data centers located across geographic areas. The service provider network may be a distributed network through which users (often customers) may interact via respective client devices to manage or otherwise interact with services provided by the service provider network, including employing an analytics service to determine when to report network activity as including a potential malicious event (e.g., an unauthorized request to access a portion of a client device, computing device, a database, or the like).

The techniques described herein can improve the quality of data transmitted using the service provider network by identifying and mitigating malicious behavior associated with various IP addresses. In some examples, the techniques can be used to reduce an amount of data transmitted over a network in association with threat notifications by more accurately identifying a threat and false positives thereby optimizing use of available network bandwidth and/or computational resources. For instance, the techniques can improve network efficiency by proactively detecting malicious instances affecting the exchange of data with various devices, and determining an action for the service provider to reduce an impact of the malicious instances (e.g., save network bandwidth, free up memory and/or processor resources, et.).

The system can represent or otherwise utilize a cloud platform that provides or hosts various types of services (also referred to as backend service). For instance, backend services may include business-application services, financial-institution services, healthcare services, and so forth. Client devices often interact or access these backend services over a network, such as the Internet, using Application Program Interface (API) calls that define an operation or interaction that the client device is requesting be performed. For example, an application or agent may be running locally on a client device to watch a video, make a purchase, etc. Data associated with the cloud platform can be used as input data to one or more models as described herein.

The system can employ a variety of different models to perform the techniques described herein. As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the examples, as described herein. Like numbers refer to like elements throughout.

FIG. 1 illustrates a system-architecture diagram of an example environment 100 for detecting and mitigating potential threats associated with a service provider network. For example, a service provider network 102 can exchange data representing audio, video, text, or other content with one or more client devices 104 associated with one or more users(s) 106. As shown, the service provider network 102 comprises services 108 and one or more computing device (s) 110 that further comprise a threat determination component 112 and one or more model(s) 114. In some examples, the computing device(s) 110 can be configured to determine an action(s) 116 for resolving a potential impact to the service provider network 102 caused by a malicious event. In some examples, the client device(s) 104 can receive data 120 representing audio and/or video for presentation as part of the service 108 of the service provider network 102. The client device(s) 104 can include a local agent 122 representing an interface for interacting with the user 106 (e.g., outputting data for presentation, receiving data from the user 106, and so on).

The model(s) 114 can receive a variety of input data 124 for processing, and determine output data 126 usable by the threat determination component 112 to determine the action (s) 116 and/or to validate a portion of the input data 124 as including a potential malicious event (e.g., a request to access a resource of the client device 104). For instance, the computing device(s) 110 can implement the threat determination component 112 and/or the model(s) 114 to receive network data representing different time periods, analyze the received data, and output an indication of the potential malicious event. In various examples, the computing device (s) 110 can initiate the action 116 to ensure that the data 120 (e.g., content) from one or more of the services 108 is exchanged with the client device(s) 104 at a minimum quality threshold. Though FIG. 1 shows the threat determination component 112 and the model(s) 114 separately for discussion purposes, functionality associated with the threat determination component 112 or the model(s) 114 can be included in the threat determination component 112, the model(s) 114, or another component or device of the service provider network 102.

In some examples, the service provider network 102 may comprise clusters of managed servers stored in data centers located across geographic areas. The service provider network 102 may be a distributed network through which users (often customers) may interact via the client device 104 to manage or otherwise interact with services 108 provided by the service provider network 102. The service provider network 102 may be managed by a service provider, and may provide various types of services 108, such as a video service, an on-demand computing service, a message-queuing service, a managed-database service, a software-execution service, application-hosting services, business-application services, financial-institution services, and/or other services. The services 108 may be a collection of computing resources configured to instantiate VM instances, containers, network functions, etc., and to provide other types of computing resources on demand. Other applications for the services 108 may be to support database applications, electronic commerce applications, business applications and/or other applications. The services 108 may include a service that configures data for different devices to receive social media content, and the computing device(s) 110 can identify potential intrusions by a threat actor before, during, and/or after transmitting the data 120 associated with the social media content.

The services 108 described above, and any other services, may be provided in one particular implementation by one or more data centers operated by the service provider. As known to those skilled in the art, data centers are facilities utilized to house and operate computing resources, such as computer systems and associated components. Data centers may also include redundant power, communications, cooling, and security systems. The data centers might be located in geographically disparate regions, and might also be connected to various other facilities, such as co-location facilities, and various wide area networks ("WANs"), such as the Internet.

The computing resources associated with the services 108 can be provisioned and de-provisioned as needed in an automated fashion. For example, the service provider network 102 might be configured to instantiate a new instance of a computing resource, such as a VM instance, in response to an increase in demand for a network service or other condition. Other types of computing resources might also be provisioned and de-provisioned in a similar manner. Services 108 in the service provider network 102 might also provide functionality for automatically scaling and/or de-scaling the computing resources based upon demand for the resources and/or other factors.

The client device(s) 104 may represent any type of computing device capable of connecting to the service provider network 102 via a suitable data communications network(s) 118 (e.g., a third-party network) such as, but not limited to, a laptop or desktop computer, a tablet computing device, a television, a server computer, a vehicle, a watch, a wearable device (sunglasses), or a mobile telephone, just to name a few. Administrative users employed by the operator of the service provider network 102, such as administrators managing the operation of the service provider network 102, might also connect with, manage, and utilize resources provided by the service provider network 102 in a similar fashion (e.g., using the computing device(s) 110).

According to the techniques described herein, user(s) 106 of the service provider network 102 may subscribe for an account with the service provider network 102 to utilize the computing infrastructure (e.g., computing resources in data centers) supporting the services 108 (e.g., memory, processing power, auto-scaling, networking and content delivery, etc.) provided for and managed by the service provider network 102. The service provider operating the service provider network 102 may charge a fee for utilization of the computing resources to a subscriber that have computing resources provisioned to support and use the services 108.

Generally, the user(s) 106 may interact via the local agent 122 to receive or employ a service from the services 108. The user(s) 106 may be one or more of individual users, groups of users, organizations, businesses, or other entities that interact with the service provider network 102 via respective client device(s) 104. In some examples, the local agent 122 can represent software that is associated with the services 108. The local agent 122 may also, or instead, represent a user interface having one or more controls (or input controls) for the user 106 to provide input usable by the threat determination component 112 to generate, update, or otherwise output determinations of malicious activity associated with the service provider network 102. For instance, the user 106 can provide input to one or more controls of the local agent 122 to log into a service and/or provide preferences related to a presentation (e.g., the data 120) on a display device of the client device(s) 104.

In some examples, the threat determination component 112 can determine presence of one or more malicious events in the data 120. The data 120 can represent activity by an IP address over a time period (e.g., a read request, a write request, or other action for a data packet). The threat determination component 112 can monitor data exchanged over the service provider network 102 continuously, and aggregate data from one or more sources at different times as the input data 124. Additionally, or alternatively, the threat determination component 112 can determine which time periods, sources, geographical regions, etc. to collect data for analysis to ensure that the received data has sufficient time to detect different types of attacks. In some instances, the threat determination component 112 may access a database (not shown) that stores data representing network activity for different time periods. In various examples, the data 120 can include state data that approximates activity associated with an IP address for a given amount of time, such as representing network activity for one minute time periods as a probabilistic data structure. In some example, the data 120 usable as the input data 124 can include the probabilistic data structures for two different one minute periods for the threat determination component 112 to compare to identify differences in IP activity over time. In some examples, the aforementioned one-minute time periods need not be in sequence and/or may represent a different amount of time than one-minute. In various examples, the first time period and the second time period may differ in length relative to one another (e.g., one time period is one-minute and the second time period is less than or more than one-minute).

As mentioned, the model(s) 114 (e.g., a machine learned model, a statistical model, heuristic model, or a combination thereof) can receive the input data 124 representing one or more of: client device data associated with the client device 104, network data indicating network metrics of one or more networks, IP address activity, port activity, etc. associated with one or more services (e.g. the services 108). The computing device(s) 110 can implement a model to aggregate the input data 124 from the services 108, the client device 104, and/or a storage device that includes network activity information, etc. The model can also analyze the aggregated data to identify potential malicious behavior in the service provider network 102, the client device 104, and/or in the network(s) 118 that may impact the client device 104 receiving or processing the data 120 at a future time. For example, the model(s) 114 can generate the output data 126 which can represent one or more classifications (e.g., is a portion of the network activity indicative of a malicious event (yes, no), has an unusual number of user account requests been made, what is the frequency of detecting a request to access are new user account by the IP address, and so on). Further discussion of functionality provided by the model(s) 114 can be found throughout this disclosure including in FIGS. 2 and 3.

In various examples, the action(s) 116 can be determined based at least in part on an output from the model(s) 114 (e.g., the output data 126 as indicated by a dashed arrow in FIG. 1). For example, the model(s) 114 can be configured to evaluate changes in behavior of various IP addresses over time for use in determining a setting of a network (e.g., a configuration of a server or other network element) that protects the network, client device, computing device, or the service provider network 102 from a security threat. In various examples, the model(s) 114 can identify malicious activity at one or more client devices and configure a message for sending to the client device(s) 104 to indicate which resources the IP address accessed or requested to access. In this way, the client device(s) 104 can receive instructions to cause the potential malicious event(s) to be monitored, contained, and/or removed. In some examples, the action(s) 116 can include the threat determination component 112 configuring a message for sending to the client device to cause the client device to output data in a user interface that indicates the resource to protect from the potential malicious event.

In some examples, the output data 126 can indicate presence of one or more potential malicious events, and a same or different model can automatically modify a network setting to remedy the potential malicious event(s). For example, the action(s) 116 can include modifying a setting of a network element of the service provider network 102 to mitigate an impact of the malicious event(s) on the service provider network 102, the client device(s) 104, and so on.

By way of example and not limitation, the input data 124 can represent data associated with the network(s) 118, the service provider network 102, and/or the client device(s) 104 (e.g., a portion of the data 120). For instance, the model(s) 114 can receive first data representing first activity associated with an IP address over a first time period and second data representing second activity associated with the IP address over a second time period before or after the first time period. In some examples, the first and second time periods can correspond to a same time, such as one minute, whereas in another example the first and second time periods can be associated with different amounts of time. In various examples, the input data 124 can include the first data and the second data associated with the second time period (e.g., prior to the first time period), and additional data associated with one or more other time periods before and/or after the first time period. The additional data (e.g., third data) can be associated with a third time period having a same of different amount of time as the first time period and/or the second time period. In some examples, the first time period and the second time period can overlap or otherwise include a same point or portion of time.

In some examples, the input data 104 can include data associated with two or more time periods such as the first time period, second time period, and/or the third time period (or other time periods based on examples). In various examples, respective time periods may or may not be consecutive, or in sequence, relative to one another (e.g., occurring directly after one another). By way of example and not limitation, a first time period can be one minute, and a second time period can be different from one minute, and the second time period can occur before or after the first time period without being required to be directly after an end time of the first time period or directly before a start time of the first time period. Thus, the input data 104 can include, for example, client device data, network data, IP address activity data, port data, or other data that is associated with one or more time periods.

Generally, the model(s) 114 can provide functionality to determining states for data associated with different time periods included in the input data 124. In some examples, the input data 124 can include activity associated with an IP address for a first time period, and the model(s) 114 can determine a state to represent or approximate the activity (e.g., millions of events such as a request to access a resource, account, memory, and the like). In some examples, the model(s) 114 can access one or more states associated with other times (e.g., before and/or after the first time period) for further processing along with the received IP activity, as discussed herein.

The model(s) 114 can determine a first state to represent the first activity over the first time period and a second state to represent the second activity over the second time period. For instance, the model(s) 114 can apply a probabilistic data structure algorithm to the input data 124 to cause activity by the IP address (e.g., a number of accounts accessed, a number of new accounts accessed, a type of resource accessed, etc.) to be represented in the data structure itself. The model(s) 114 can compare a first data structure for the first time period to a second data structure for the second time period, and based on a difference between the first and second data structures (or points thereof), output a classification of whether the first activity or the second activity includes a potential malicious event. In various examples, the model(s) 114 can determine that the difference between the first activity and the second activity by the IP address meets or exceeds a threshold value, and output an indication of the potential malicious event for sending to one or more devices (e.g., the computing device(s) 110, the client device(s) 104, etc.) based on the difference in the corresponding probabilistic data structures meeting or exceeding the threshold value.

In various examples, the first activity and/or the second activity can be associated with content transmitted in associated with at least one geographical region or at least one Content Delivery Network. For example, the input data 124 can be associated with one or more geographical regions, Content Delivery Networks, and the like. The first activity can represent network activity exchanged with a Content Delivery Network, and the second activity can represent different network activity exchanged with the Content Delivery Network over a different time period. In some examples, data associated with another Content Delivery Network and/or another geographical region can also be received as the input data 124.

In various examples, the probabilistic data structure for a data set (e.g., the first data, the second data, and so on) can approximate a number of user accounts that the IP address exchanged data with during the respective time period, a number of data exchanges with a user account during the respective time period, or a resource requested by the IP address during the respective time period.

In some examples, the computing device(s) 110 can implement the state determination component 208 to determine a state to represent millions of actions by an example IP address over one minute (e.g., a first time period), and continuously update the state of the IP address over time by comparing another state representing additional actions by the IP address over a subsequent minute (e.g., a second time period). The computing device(s) 110 can also track other IP addresses simultaneously and be scaled to maintain the state for the time periods (for a predetermined time before being erased from storage) as a number of IP addresses being tracked and/or a number of attacks by a threat actor increase over time. In various examples, the state be represent a hash value of the aforementioned probabilistic data structure(s) and/or attributes determined for each time period (e.g., a hash of a number of accounts, a proportion of new accounts, a rate of accessing a new account, and so on).

In some examples, the client device(s) 104 can be associated with different user accounts that provide a service (one of the services 108) using the service provider network 102. To protect the client device(s) 104 or hardware associated with therewith from a malicious event, an entity operating the client device(s) 104 can use a detection service (e.g., the computing device(s) 110 or functionality thereof) configured to identify a scanner and determine when to report activity as being initiated by the scanner. Network activity for a time period can be analyzed and compared by the computing device(s) 110 to previous network activity to preemptively detect a variety of attack types based on determined states for each network activity time period. IP addresses acting on behalf of a threat actor can be identified and/or distinguished from authorized and validated user accounts. A same or different model can be implemented by the computing device(s) 110 and/or the client device(s) 104 to mitigate an impact of a potential threat based on the indication of the potential malicious event. In this way, a social media service, online business, gaming service, and the like, can be protected from malware or unauthorized access by the threat actor.

Figure 2:
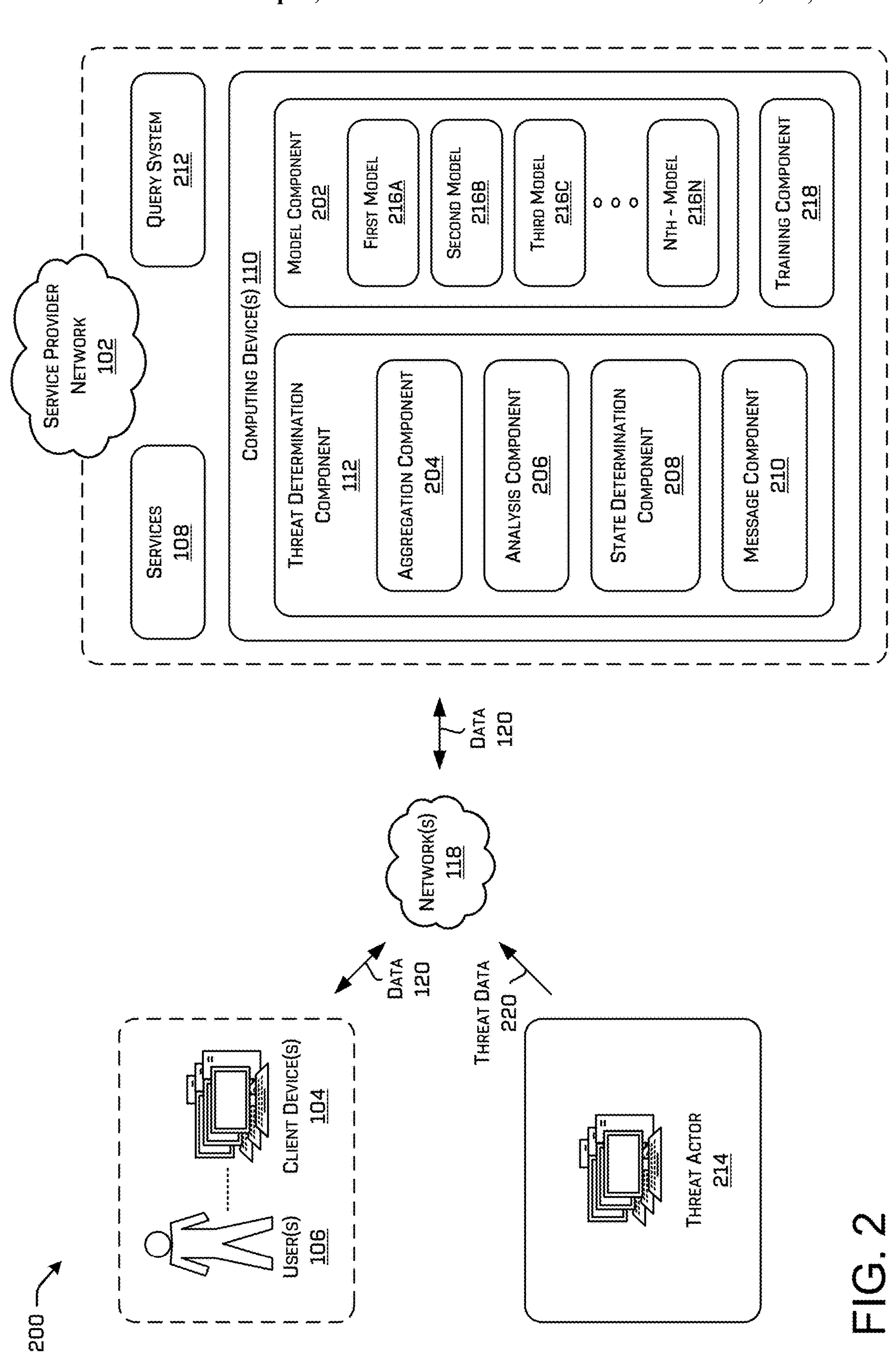
FIG. 2 illustrates a diagram of an example service provider network implementing example components to perform the techniques described herein.

FIG. 2 illustrates a diagram 200 of an example service provider network implementing example components to perform the techniques described herein. For example, the service provider network 102 can implement the computing device(s) 110 and the threat determination component 112 of FIG. 1. As shown in FIG. 2, the computing device(s) 110 comprises a model component 202, the threat determination component 112 which further comprises an aggregation component 204, an analysis component 206, a state determination component 208, and a message component 210. The service provider network 102 further includes a query system 212. Though depicted in FIG. 2 as separate components of the threat determination component 112, the functionality associated with the aggregation component 204, the analysis component 206, the state determination component 208, the message component 210, and/or the query system 212 can be included in a different component of the service provider network 102 or the computing device(s) 110. In some instances, the components described herein may comprise a pluggable component, such as a virtual machine, a container, a serverless function, etc., that is capable of being implemented in any service provider network and/or in conjunction with any API gateway.

The diagram 200 further depicts the data 120 (e.g., data associated with a service of the service 108, data associated with a client device, a replication of a data stream, user profile data, etc.) being exchangeable with the service provider network 102, the client device(s) 104 associated with the user(s) 106, and a threat actor 214 initiating a malicious attack by exchanging threat data 220 over the network(s) 118. The threat actor 214 can attempt to act as an IP address of a computing device, such as the client device(s) 104 by including the threat data 220 into the service provider network 102. The threat data 220 can represent a variety of different attack types and, depending on examples, can include requests to access data associated with personal information, a user account, financial information, and the like. Using the techniques described herein enables network activity of various time periods to be analyzed to identify an attack related to port scanning, brute-force, credential stuffing, password guessing, and the like.

In some examples, the threat determination component 112 and/or the model component 202 (or models thereof) can receive the input data 124 for processing, and generate the output data 126. The threat determination component 112 can, in some examples, provide output data usable to determine presence of potential malicious activity over the service provider network 102 and/or the network(s) 118. For example, the threat determination component 112 can monitor and protect the services 108, the client device(s) 104, and so on. By way of example and not limitation, the threat determination component 112 can receive the input data 124 representing network activity for a current time period, and generate a state of the network activity that approximates the network activity for the time period.

The threat determination component 112 and/or the model component 202 can determine that an IP address changes a number of resources accessed and/or a rate of accessing a new resource over time. If the change in the number of resources accessed and/or the rate of accessing the new resource meets or exceeds a threshold value, the threat determination component 112 and/or the model component 202 can generate the output data indicating presence of potential malicious activity.

As shown in FIG. 2, the model component 202 includes one or more models, such as a first model 216A, a second model 216B, a third model 216C up to an Nth model 216N (collectively "models 216"), where N can be any integer greater than 1. The models 216 may be stored on, or otherwise accessible by, memory associated with the computing device(s) 110. The models 216 may represent machine learned models, statistical models, heuristic models, or a combination thereof, and may be implemented in association with a component of the computing device(s) 110. In various examples, the model component 202 can include at least the functionality associated with the model(s) 114.

In some examples, the first model 216A can determine a number of unique points between two data sets. For instance, the first model 216A can determine a first value representing cardinality between a first data set of network activity over a first time period and a second data set of network activity over a second time period after the first time period. In some examples, the first model 216A can determine a HyperLogLog value for each data set (e.g., a probabilistic data structure), and compare the HyperLogLog values one o another, and if the values are within a threshold value, output a determination that some of the network activity is a potential malicious event.

In various examples, the second model 216B can determine a rate at which the IP address accesses a new resource (e.g., instance, account, data point, etc.). For example, the second model 216B can record a time that each new resource is initially accessed and determine a rate at which new resources are accessed by the IP address for a time period and/or between time periods. In some examples, the second model 216B can determine a MinHash value to represent an output, such as the rate that the IP address accesses new resources.

The aggregation component 204 can represent functionality to sample, receive, collect, or otherwise determine data for processing by a component of the computing device(s) 110. In some examples, the aggregation component 204 can sample or receive data based at least in part on criteria provided by a model and/or an input from a user (e.g., an administrator of the service provider). For instance, the criteria can identify a source(s) from which to sample data, a start time, an end time, etc. The criteria may also or instead identify a network entity (e.g., a service) for sampling data based on performance of the network entity at a previous time, a request from an end-user, or as part of an analytic service, among others. In various examples, the aggregation component 204 can receive an instruction from another component or a user identifying the criteria (e.g., a time period) for sampling the data.

Generally, the analysis component 206 can represent functionality to analyze data associated with the service provider network 102 such as the sampled or received data from the aggregation component 204. The analysis component 206 can represent functionality to generate the output data 126 including, for example, determining a change in network activity associated with the client device(s) 104 over time. For example, sampled data can be analyzed for a first period of time to establish a first pattern (or data structure) of network activity that can be compared to a second pattern of network activity for a second period of time after the first period of time. By comparing the patterns of network activity from different time periods, the analysis component 206 can identify a difference that indicates a potential malicious event associated with the data 120 (e.g., the threat data 220 has accessed the client device(s) 104).

The state determination component 208 can represent functionality to determine a state to represent activity by an IP address over a time period. In some examples, the state can be a hash value (e.g., a MinHash) based on applying hash function to a probabilistic data structure of the activity. The state may also or instead represent a hash value based on applying a hash function to a data set, such as a set of data points determined from the input data 124 (e.g., a number of accounts accessed, a number of new accounts accessed per time period, a rate of accessing a new account, etc.).

The message component 210 can represent functionality to generate, configure, or exchange a message between the computing device(s) 110 and another device such as the client device(s) 104. For example, the message component 210 can configure a message for sending to the client device(s) 104 based on the analysis component 206 determining presence of a potential malicious event. The message can be included in the data 120 to notify the client device(s) 104 of the potential malicious event and optionally include a solution to mitigate an impact of the potential malicious event on the client device(s) 104. The message component 210 can configure a message for sending to a device based at least in part on receiving an indication of the potential malicious event from the analysis component 206 (e.g., based on comparing states of network activity over time).

In various examples, the service provider network 102 can implement a query system 212 to initiate, execute, and compile results for various queries. The computing device(s) 110 can implement the query system 212 to provide detail relative to information received as part of the aggregated data. If the aggregated data indicates a potential malicious event, the query system 212 can be used to gather more detailed information from one or more entities. In some examples, the query system 212 can target pre-determined network information that may be useful for understanding context of the potential incident (e.g., a resource targeted by the IP address).

In various examples, the action(s) 116 can include the threat determination component 112 initiating a query using the query system 212. For example, the query can collect information associated with the potential malicious event, and configure the query results use in determining the output data 126. In some examples, the query system 212 can represent an interface for gathering information from one or more sources and may be employed to collect data surrounding a potential malicious event (e.g., to validate the malicious event, identify a strategy for defending against the potential malicious event, etc.).

The computing device(s) 110 can include a training component 218 to provide functionality to train a machine learning model usable to implement one or more of the techniques discussed herein to determine presence of a threat associated with network activity, or the like. In some examples, the training component 218 can include training data that has been generated by one or more machine learned models or components described herein. For example, the training component 218 can receive user information and network information associated with the output data 126 for use as training data (e.g., a threshold value, an example rate for accessing a particular resource, and the like). Third-party labeled training data can also or instead be used for training in various examples.

In some examples, the computing device(s) 110 can implement the training component 218 to improve detection and classification of data as having a potentially malicious impact on operation of a network or device. In some examples, ground truth network behaviors may be determined over time based on state determinations and/or probabilistic data structures (either hand labelled or determined by another machine learned model) and such ground truth network behaviors may be used to determine a pattern of malicious behavior by a threat actor. Depending on the model being trained, ground truth can include examples of a normal (or expected) network pattern of behavior and an abnormal (or unexpected) network pattern of behavior to train the model to output a classification of whether monitored network behavior is indicative of an occurrence of a potential malicious event.

In various examples, one or more components (e.g., the state determination component 208, etc.) can include or access a database (e.g., the database 508 of FIG. 5 or a database local to the computing device(s) 110), a container registry, a memory, or other storage device to store network data, user data, and other data usable for implementing the techniques discussed herein. Some stored data can be used as input data (or training data) into a model as described herein.

Figure 3:
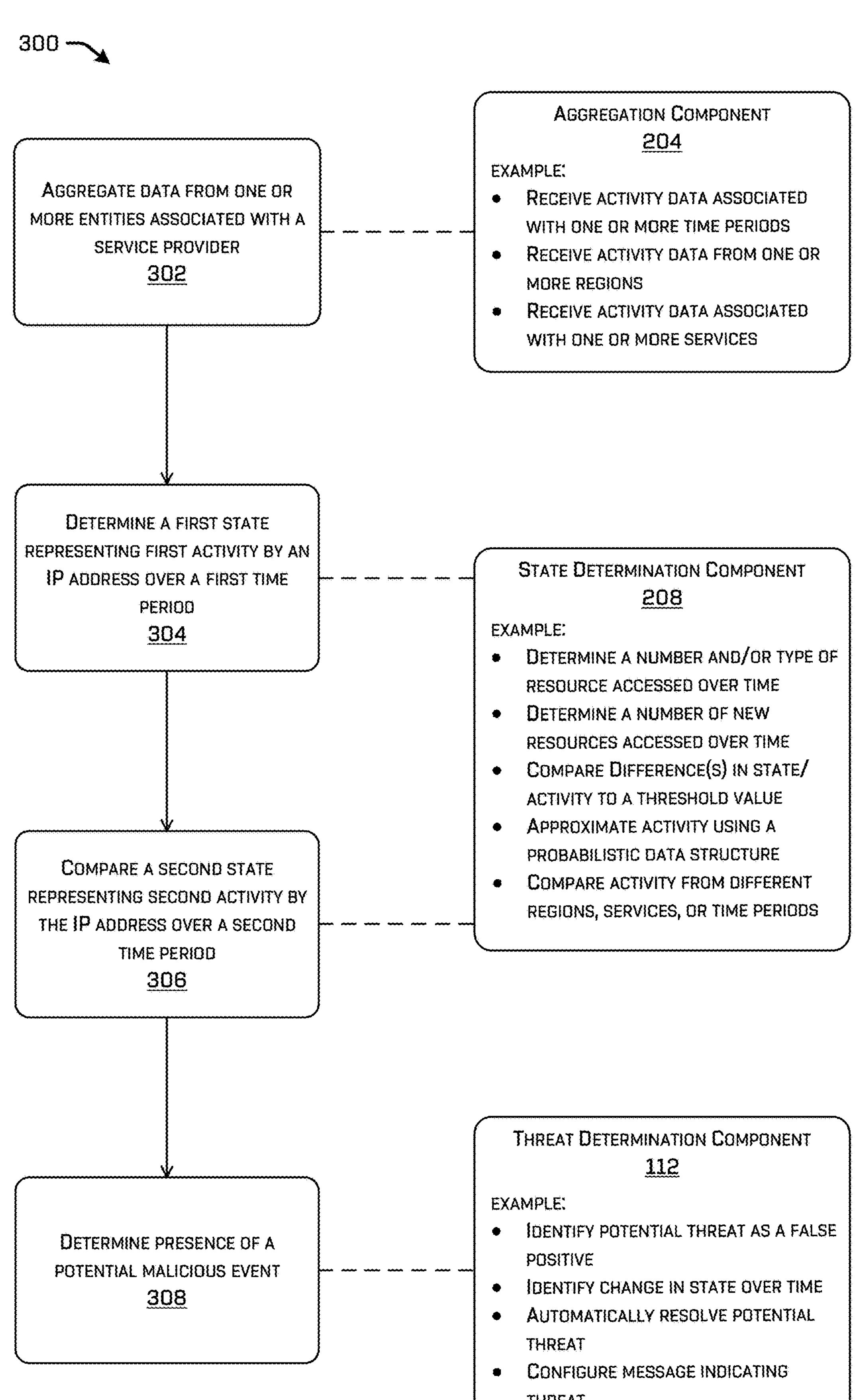
FIG. 3 is a pictorial diagram illustrating an example process by an example computing device to determine presence of a potential malicious event as described herein.

FIG. 3 is a pictorial diagram illustrating an example process 300 by an example computing device to determine presence of a potential malicious event as described herein.

The example process 300 may be implemented by a computing device such as the computing device(s) 110 of FIG. 1.

An operation 302 can include aggregating data from one or more entities associated with a service provider. For example, the aggregation component 204 can receive data from one of: a service, a client device, a data center, or a network associated with the service provider network 102. In some examples, the aggregation component 204 can receive first activity data associated with a first time period (e.g., from a database) and second activity data associated with a second time period (e.g., from the database or from a device such as the client device). In some examples, the aggregation component 204 can aggregate the data from a network, Content Delivery Network, or other entity associated with the service provider network 102. The aggregated data can represent activity data associated with one or more time periods, activity data from one or more geographical regions, activity data associated with one or more services (e.g., one or more of the services 108), and the like.

An operation 304 can include determining a first state representing first activity by an IP address over a first time period. For example, the operation 304 can include the state determination component 208 analyzing the aggregated data to output a state value of the first activity (e.g., a number of accounts accessed, a number of new accounts accessed, a rate of accessing a new resource, etc.). The state determination component 208 can determine a probabilistic data structure to represent the first activity data, an additional probabilistic data structure for the second activity data, and so on.

An operation 306 can include comparing a second state representing second activity by the IP address over a second time period. For instance, the operation 304 can include the state determination component 208 determining a second state representing second activity by the IP address over a second time period (e.g., after the first time period) and comparing the state values (or associated probabilistic data structures) one to another. In some examples, the state value for the IP address can be determined by applying a hash function to at least some of the data points in the received network activity. The first state and/or the second state can represent, for example, a number of resources, a type of resource, and/or a number of new resources accessed by the IP address for a respective time period.

The operation 306 can include the state determination component 208 comparing respective states, probabilistic data structures (or data points thereof), or other representation of the aggregated data for two or more time periods, one to another to identify a difference between the first activity and the second activity. The change in the first activity and the second activity can represent a change in the IP address activity over consecutive, equal time periods. In various examples, the difference can indicate that the second activity includes the IP address accessing new accounts at a greater rate than with previous activity of similar time periods. In various examples, the operation 306 can include comparing probabilistic data structures representing different time periods to identify unique points in one of the probabilistic data structures (e.g., cardinality).

An operation 308 can include determining presence of a potential malicious event. For example, the operation 308 can include the threat determination component 112 generate data indicating a portion of the second activity is a potential threat from a threat actor based on the comparing of activity data from two time periods (e.g., the probabilistic data structures, the states, etc.). In various examples, the threat determination component 112 can generate a classification that a potential malicious event is not present in the received network activity (e.g., the difference does not meet or exceed a threshold value).

Figure 4:
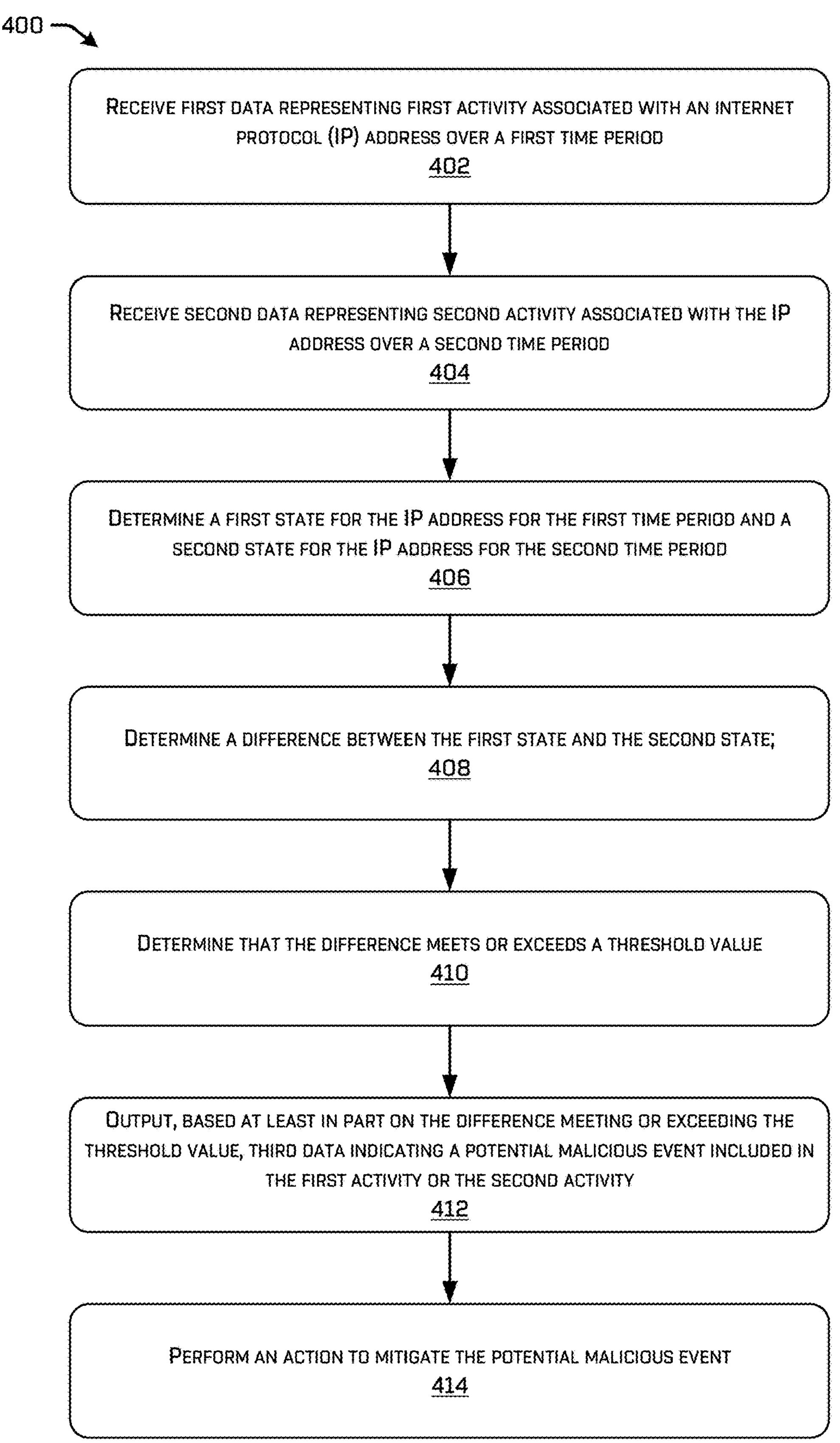
FIG. 4 is a flow diagram of an example method for outputting an indication of a potential malicious event, and performing an action to mitigate the potential malicious event.

FIG. 4 is a flow diagram of an example method 400 for outputting an indication of a potential malicious event, and performing an action to mitigate the potential malicious event. For example, the service provider network 102 can identify activity by an IP address that is indicative of a potential malicious event. The service provider network 102 can implement the threat determination component 112 and/or the model component 202 to detect, label, and/or mitigate the potential malicious event.

At 402, the threat determination component 112 associated with the service provider network 102 may receive first data representing first activity associated with an internet protocol (IP) address over a first time period. For instance, the threat determination component 112 can receive the input data 124 representing activity by an IP address, a client device, a port, and the like. In some examples, the aggregation component 204 can sample or otherwise receive the first data representing activity associated with one or more of the services 108. The first activity can represent, for instance, activity (a read request, a write request, a request to view data, etc.) by an IP address of a client device and/or an IP address of a treat actor behaving as the client device.

At 404, the threat determination component 112 associated with the service provider network 102 may receive second data representing second activity associated with the IP address over a second time period. The second data can represent network activity by the IP address of the client device and/or the IP address of the treat actor over a previous or subsequent time period relative to the first data. In some examples, the first time period and the second time period are equal, and can include 50 seconds, 60 seconds, 70, seconds, or some other time period. In some examples, the first time period and the second time period can differ to capture network activity over varying time periods (e.g., to identify malicious events caused by attacks that takes different amounts of time to enact by the threat actor).

At 406, the threat determination component 112 associated with the service provider network 102 may determine a first state for the IP address for the first time period and a second state for the IP address for the second time period. For example, the state determination component 208 can output a state value (e.g., a probabilistic data structure, a HyperLogLog value, a MinHash value, or the like).

At 408, the service provider network 102 may determine a difference between the first state and the second state. For example, the state determination component 208 can determine the first state or the second state to represent attributes likes a number of user accounts the IP address requested access to, at least one resource requested by the IP address, and/or a rate of accessing a new resource, and further determine a difference between one or more or the attributes to represent a difference between the first activity and the second activity. In some examples, the difference indicates a number of new accounts accessed by the IP address and a total number of resources accessed by the IP address as part of the first activity and the second activity.

At 410, the service provider network 102 may determine that the difference meets or exceeds a threshold value. The analysis component 206 can, for example, compare a state value for IP address activity for a first time period to another state value for IP address activity for a second time period, and compare the difference in state values to a threshold value. Additionally, or alternatively, the analysis component 206 can determine whether a difference in a number of resources accessed and/or a rate of new resources accessed by the IP address meets or exceeds the threshold value. In various examples, the model component 202 can compare a difference in probabilistic data structures for the two time periods to the threshold value. The threshold value can represent a value that is pre-determined by a user and/or a model (e.g., a machine learned model) to reflect whether a difference over time is sufficient to classify a portion of the network activity as possibly originating from a threat actor (e.g., the threat actor 214).

At 412, the service provider network 102 may output, based at least in part on the difference meeting or exceeding the threshold value, third data indicating a potential malicious event included in the first activity or the second activity. The analysis component 206 can, for example, determine presence of the potential malicious event based at least in part on the difference in the state values, probabilistic data structures, or other representation of the network activity.

At 414, the service provider network 102 may perform an action to mitigate the potential malicious event. For example, the threat determination component 112 can implement a strategy to defend against the potential malicious event such as automatically modifying a setting of a network element, application, or service of the service provider network to reduce impact of the potential malicious event. The action can also or instead include configuring a message for sending to one or more computing devices accessed by the IP address such that the message indicates a portion of the one or more computing devices to protect from the potential malicious event included in the first activity or the second activity.

FIGS. 3 and 4 illustrate flow diagrams of example methods or processes that illustrate aspects of the functions performed at least partly by the service provider network 102 as described in relation to FIG. 1 and elsewhere. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some examples, the techniques of process 300 and/or the method 400 may be performed by a system comprising one or more processors and one or more computer-readable media storing computer-executable instructions that, when executed by the one or more processors, cause the one or more processors to perform the operations of the methods.

FIG. 5 illustrates a system and network diagram 500 of an example operating environment that includes a service provider network (that may be part of or associated with a cloud-based service network/platform) for implementing the techniques described herein. The service provider network 102 can include an API gateway 502 that may receive an API call and route the API call to a component or service. In various examples, the service provider network 102 can include the threat determination component 112 which comprises the aggregation component 204, the analysis component 206, the state determination component 208, and the message component 210.

The service provider network 102 can provide computing resources (e.g., computational resource(s) 506A, computational resource(s) 506B, computational resource(s) 506C up to an Nth computational resource(s) 506N (collectively "computational resources 506", where N can be any integer greater than 1) like VM instances, containers, serverless functions, storage, etc., on a permanent or an as-needed basis. Among other types of functionality, the computing resources 506 provided by the service provider network 102 may be utilized to implement the various cloud-based services. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. As shown, the service provider network 102 can include a database 508 for use in association with the malicious behavior detection techniques discussed herein. The service provider network 102 can also be configured to provide other types of computing resources not mentioned specifically herein.

The computing resources 506 provided by the service provider network 102 may be enabled in one example by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative example for a data center 504 that can be utilized to implement the technologies disclosed herein will be described below with regard to FIG. 7.

The data centers 504 may be configured in different arrangements depending on the service provider network 102. For example, one or more data centers 504 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The users and/or admins of the service provider network 102 may access the computing resources 506 provided by the data centers 504 of the service provider network 102 over any wired and/or wireless network(s) 118 (utilizing a client device 104 and/or another accessing-user device), which can be a wide area communication network ("WAN"), such as the Internet, an intranet or an Internet service provider ("ISP") network or a combination of such networks. For example, and without limitation, a device operated by a user of the service provider network 102 may be utilized to access the service provider network 102 by way of the network(s) 118. It should be appreciated that a local-area network ("LAN"), the Internet, or any other networking topology known in the art that connects the data centers 504 to remote clients and other users can be utilized. It should also be appreciated that combinations of such networks can also be utilized.

In a distributed computing environment, such as the one included in the service provider network 102 (e.g., computing-resource network), a fleet of VM instances and/or servers may have workflow or processes executed thereon to manage resources. For instance, a patch may need to be installed on each VM instance and/or resource at a particular time. In such distributed applications of workflows or processes, a load balancer may be at the front end in front of the fleet of servers where a request for a workflow comes in, and the load balancer distributes the request to execute the workflow amongst the servers.

Figure 6:
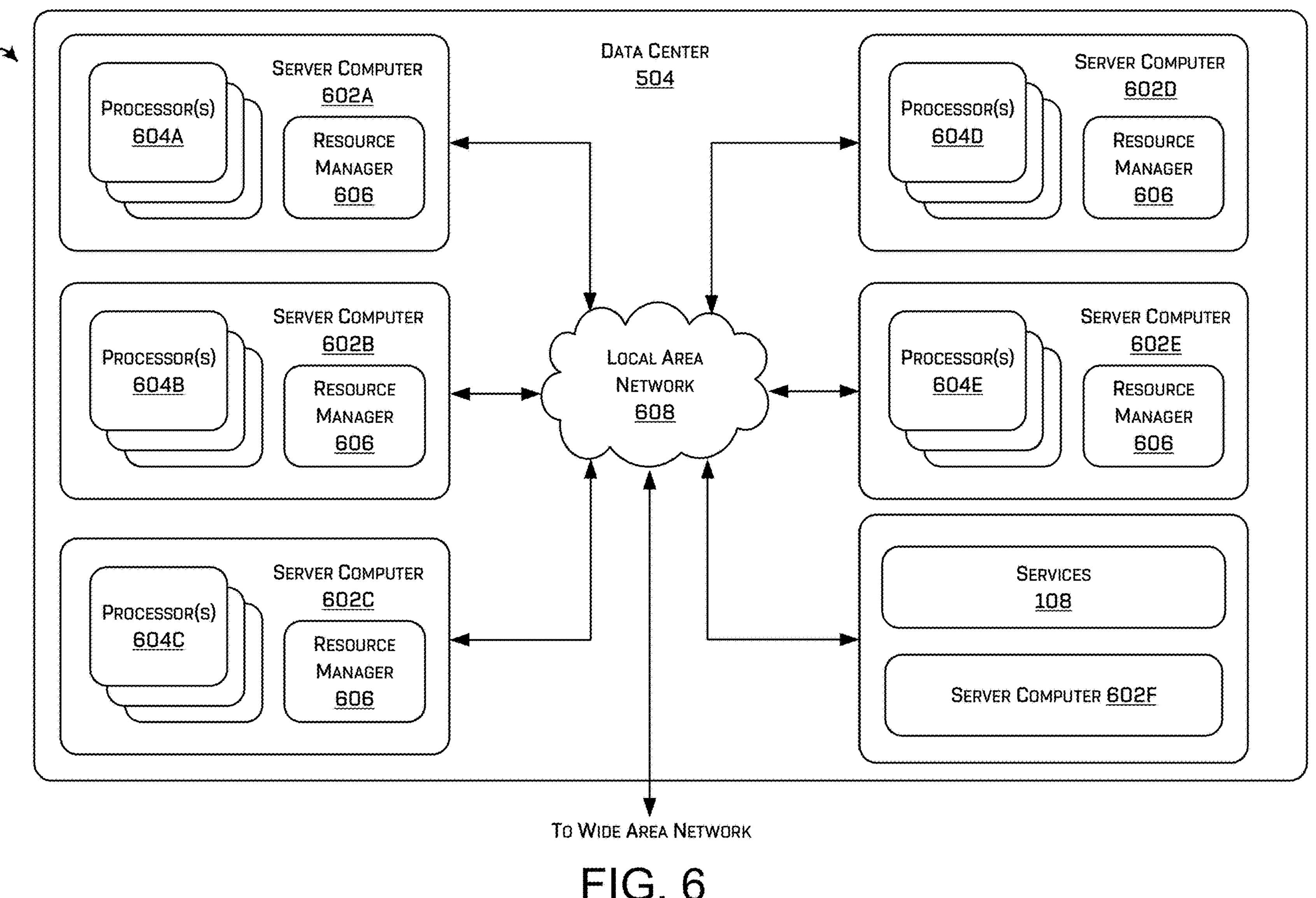
FIG. 6 is a diagram illustrating a configuration for an example data center that can be utilized to implement aspects of the techniques disclosed herein.

FIG. 6 is a diagram 600 illustrating a configuration for an example data center that can be utilized to implement aspects of the techniques disclosed herein. The example data center 504 shown in FIG. 5 includes several server computers 602A-602F (which might be referred to herein singularly as "a server computer 602" or in the plural as "the server computers 602") each having one or more processors 604A, 604B, 604C, 604D, and 604E. In some examples, the processor(s) 604 can represent a central processing unit (CPU), a graphics processing unit (GPU), a Tensor Processing Unit (TPU), an integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

The server computers 602 can be standard tower, rack-mount, or blade server computers configured appropriately for providing the computing resources described herein (illustrated in FIG. 6 as the processor(s) 604A-604E). As mentioned above, the computing resources provided by the service provider network 102 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 6.

The data center 504 shown in FIG. 6 also includes a server computer 602F that can execute some or all of the software components described above. For example, and without limitation, the server computer 602F can be configured to execute components of the service provider network 102, including the services 108.

In the example data center 504 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the server computers 602. It should be appreciated that the configuration of the data center 504 described with reference to FIG. 6 is merely illustrative and that other implementations can be utilized.

Figure 7:
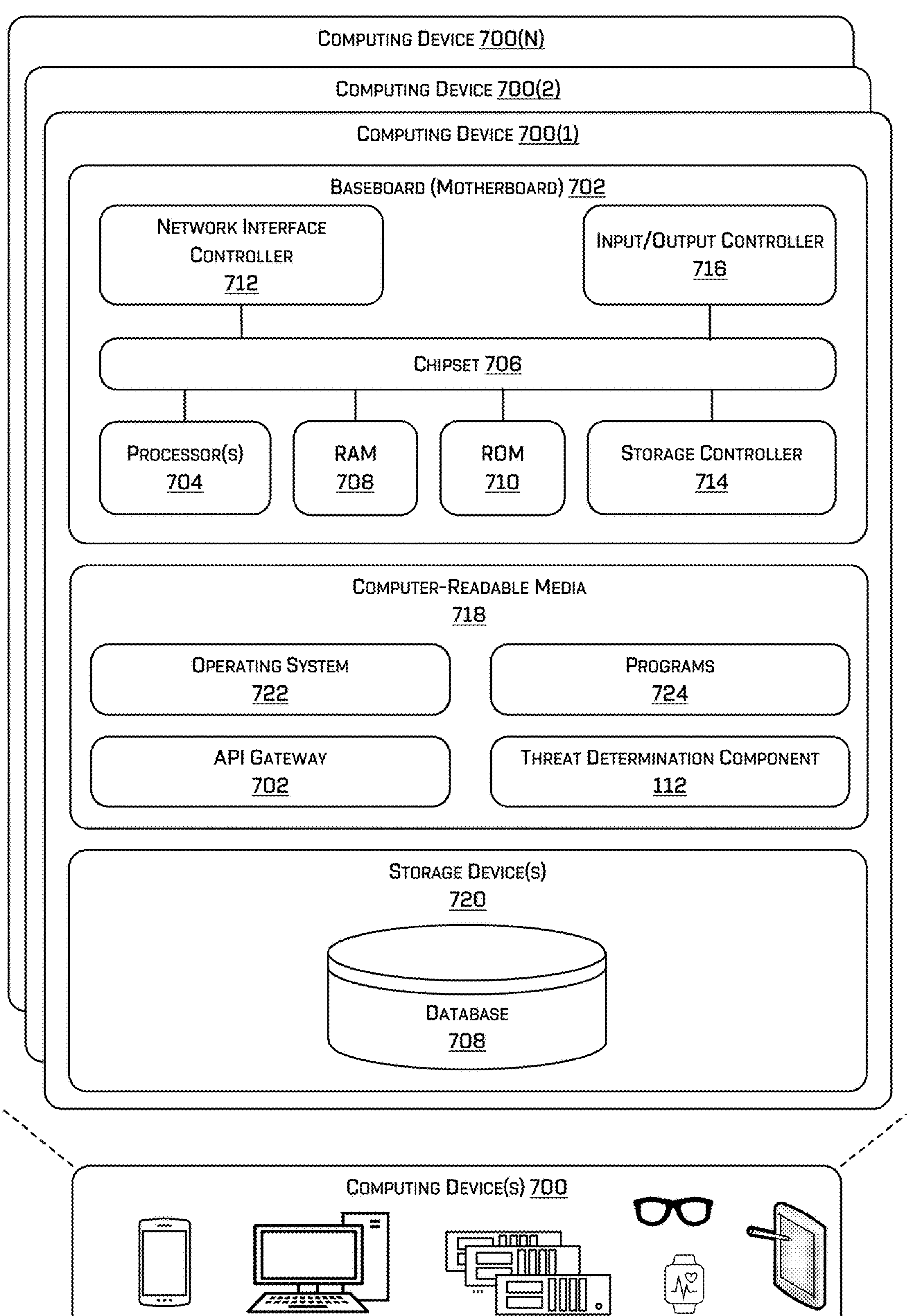
FIG. 7 is a computer architecture diagram showing an illustrative computer hardware architecture for implementing one or more computing devices to perform the techniques disclosed herein.

FIG. 7 is a computer architecture diagram showing an illustrative computer hardware architecture for implementing one or more computing devices 700 to perform the techniques disclosed herein. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computing device 700 includes a baseboard 702, or "motherboard," which is a printed circuit board to which a multitude of components or devices can be connected by way of a system bus or other electrical communication paths. In one illustrative configuration, one or more processor(s) 704 (e.g., CPU, GPU, TPU, and the like) operate in conjunction with a chipset 706. The processor(s) 704 can be standard programmable processors that perform arithmetic and logical operations necessary for the operation of the computing device 700.

The processor(s) 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the processor(s) 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network(s) 118. The chipset 706 can include functionality for providing network connectivity through a network interface controller (NIC 712), such as a gigabit Ethernet adapter. The NIC 712 is capable of connecting the computing devices 700 over the network(s) 118. It should be appreciated that multiple NICs 712 can be present in the computing device 700, connecting the computer to other types of networks and remote computer systems.

The computing device 700 can be connected to one or more computer-readable storage media 718 storing software components for the computer device 700, and one or more mass storage devices 720 for storing data. The computer-readable storage media 718 can store an operating system 722, programs 724, the API gateway 502, and the threat determination component 112, which have been described in greater detail herein. The mass storage device 720 can be connected to the computing device 700 through a storage controller 714 connected to the chipset 706. The mass storage device 720 can consist of one or more physical storage units. The storage controller 714 can interface with the physical storage units through a Small Computer System Interface ("SCSI"), a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable storage media 718 may store the components described herein as executable, computer-readable instructions. For instance, the components may include the API gateway 502, the model component 202, the threat determination component 112, or components associated with the threat determination component 112. The components may be stored and/or executed on a single server, or on a system of two or more computing devices 700.

The computing device 700 can store data on the mass storage device 720 by transforming the physical state of the physical storage units to reflect the information being stored. The specific transformation of physical state can depend on various factors, in different examples of this description. Examples of such factors can include, but are not limited to, the technology used to implement the physical storage units, whether the mass storage device 720 is characterized as primary or secondary storage, and the like.

For example, the computing device 700 can store information to the mass storage device 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the mass storage device 720 by detecting the physical states or characteristics of one or more particular locations within the physical storage units.

In addition to the mass storage device 720 described above, the computing device 700 can have access to the computer-readable storage media 718 to store and retrieve information, such as program modules, event structures, or other data. It should be appreciated by those skilled in the art that computer-readable storage media is any available media that provides for the non-transitory storage of data and that can be accessed by the computing device 700. In some examples, the operations performed by the service provider network 102, and or any components included therein, may be supported by one or more devices similar to computing device 700. Stated otherwise, some or all of the operations performed by the service provider network 102, and or any components included therein, may be performed by one or more computer devices 700 operating in a cloud-based arrangement. As shown, the mass storage device 720 may store the database 508 that includes information about meeting data, sensor data, user profiles, and services as well as rules and access policies.

By way of example, and not limitation, computer-readable storage media 718 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disc ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 720 can store an operating system 722 utilized to control the operation of the computing device 700. According to one example, the operating system comprises the LINUX operating system. According to another example, the operating system comprises the WINDOWS® SERVER operating system from MICROSOFT Corporation of Redmond, Washington. According to further examples, the operating system can comprise the UNIX operating system or one of its variants. It should be appreciated that other operating systems can also be utilized. The mass storage device 720 can store other system or application programs and data utilized by the computing device 700.

In one example, the mass storage device 720 or other computer-readable storage media 718 is encoded with computer-executable instructions which, when loaded into the computing device 700, transform the computer from a general-purpose computing system into a special-purpose computer capable of implementing the examples described herein. These computer-executable instructions transform the computing device 700 by specifying how the processor(s) 704 transition between states, as described above. According to one example, the computing device 700 has access to computer-readable storage media storing computer-executable instructions which, when executed by the computing device 700, perform the various processes described above with regard to FIGS. 1-7. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

In various examples, the service provider network may be part of or associated with a cloud-based service network that can be configured to implement aspects of the functionality described herein.

The service provider network 102 can provide computing resources, like physical servers, VM instances, containers, serverless functions, network functions, and storage, on a permanent or an as-needed basis. Among other types of functionality, the computing resources provided by the service provider network 102 may be utilized to implement the various services described above. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 504 (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A system comprising:

one or more processors; and one or more non-transitory computer-readable media storing instructions executable by the one or more processors, wherein the instructions, when executed, cause the one or more processors to perform operations comprising:

receiving first data representing first activity associated with an internet protocol (IP) address over a first time period;

receiving second data representing second activity associated with the IP address over a second time period that is subsequent to the first time period;

determining a probabilistic data structure to approximate a first number of accounts that the IP address exchanged data with during the first time period and a second number of data exchanges with an account over the first time period;

determining a first state for the IP address for the first time period and a second state for the IP address for the second time period, the first state or the second state including a value to represent the first activity or the second activity by the IP address for the first time period or the second time period, and wherein determining the first state is based at least in part on the probabilistic data structure;

determining a difference between the first activity and the second activity based on comparing the first state and the second state;

determining that the difference meets or exceeds a threshold value; and configuring, based on the difference meeting or exceeding the threshold value, a message for sending to one or more computing devices accessed by the IP address, the message indicating a portion of the one or more computing devices to protect from a potential malicious event included in the first activity or the second activity.

2. The system of claim 1, the operations further comprising:

applying a probabilistic data structure algorithm to the first data to approximate a first number of user accounts that the IP address exchanged data with during the first time period, a second number of data exchanges with a user account during the first time period, or a resource requested by the IP address during the first time period, wherein determining the first state is based on the probabilistic data structure algorithm.

3. The system of claim 1, wherein:

the first state or the second state represents a first number of user accounts the IP address requested access to and at least one resource requested by the IP address, and the difference between the first activity and the second activity indicates a second number of new accounts accessed by the IP address and a total number of resources accessed by the IP address as part of the first activity and the second activity.

4. The system of claim 1, wherein the first state represents a first hash value and the second state represents a second hash value and the operations further comprising:

storing the first hash value and the second hash value in a storage device for determining a third state of the IP address during a third time period that is subsequent to the second time period.

5. The system of claim 1, the operations further comprising:

determining a rate at which the IP address accesses a new resource based on comparing the first state and the second state; and determining, based on the rate, a third time period for sampling third data representing third activity associated with the IP address.

6. A computer-implemented method comprising:

receiving first data representing first activity associated with an internet protocol (IP) address over a first time period;

receiving second data representing second activity associated with the IP address over a second time period;

determining a probabilistic data structure to approximate a first number of accounts that the IP address exchanged data with during the first time period and a second number of data exchanges with an account over the first time period;

determining a first state for the IP address for the first time period and a second state for the IP address for the second time period, wherein the first state represents a value or data structure that approximates the first activity over the first time period, and wherein determining the first state is based at least in part on the probabilistic data structure;

determining a difference between the first state and the second state;

determining that the difference meets or exceeds a threshold value;

outputting, based at least in part on the difference meeting or exceeding the threshold value, third data indicating a potential malicious event included in the first activity or the second activity; and performing an action to mitigate the potential malicious event.

7. The computer-implemented method of claim 6, wherein performing the action comprises one of:

configuring a message for sending to one or more computing devices accessed by the IP address, the message indicating a portion of the one or more computing devices to protect from the potential malicious event included in the first activity or the second activity, or automatically modifying a setting of a network element of a service provider network to reduce impact of the potential malicious event to the portion of the one or more computing devices.

8. The computer-implemented method of claim 6, wherein the probabilistic data structure is a first probabilistic data structure, the method further comprising:

determining a second probabilistic data structure to approximate a third number of accounts the IP address exchanged data with during the second time period and a fourth number of data exchanges with the account over the second time period; and determining a difference between the first probabilistic data structure and the second probabilistic data structure, wherein outputting the third data indicating the potential malicious event included in the first activity or the second activity is further based at least in part on the difference between the first probabilistic data structure and the second probabilistic data structure.

9. The computer-implemented method of claim 6, wherein:

the first state or the second state represents one of: a first number of user accounts the IP address requested access to or at least one resource requested by the IP address, and the difference between the first state and the second state indicates a second number of new accounts accessed by the IP address and a total number of resources accessed by the IP address as part of the first activity and the second activity.

10. The computer-implemented method of claim 6, wherein the first state represents a first hash value and the second state represents a second hash value and the method further comprising:

comparing the first hash value to the second hash value, wherein outputting the third data indicating the potential malicious event included in the first activity or the second activity is further based at least in part on the comparing.

11. The computer-implemented method of claim 6, further comprising:

determining a rate at which the IP address accesses a new resource based at least in part on comparing the first state and the second state, wherein outputting the third data indicating the potential malicious event included in the first activity or the second activity is further based at least in part on the rate.

12. The computer-implemented method of claim 6, further comprising:

determining, by a machine learned model, the threshold value based at least in part on training data indicating a proportion of new accounts associated with historical threat information for a computing device or previous resources accessed by a particular IP address.

13. The computer-implemented method of claim 6, wherein:

the first activity and the second activity are associated with content transmitted by at least one geographical region or at least one Content Delivery Network.

14. The computer-implemented method of claim 6, wherein the first data and the second data are received from a computing device, and the method further comprising:

sending the third data to the computing device; and causing the computing device to modify a setting to reduce access to a resource by the IP address.

15. The computer-implemented method of claim 6, further comprising:

aggregating states indicative of network behavior for a geographical region, wherein outputting the third data indicating the potential malicious event included in the first activity or the second activity is further based at least in part on the aggregating.

16. One or more non-transitory computer-readable media storing instructions that, when executed, cause one or more processors to perform operations comprising:

receiving first data representing first activity associated with an internet protocol (IP) address over a first time period;

receiving second data representing second activity associated with the IP address over a second time period;

determining a probabilistic data structure to approximate a first number of accounts that the IP address exchanged data with during the first time period and a second number of data exchanges with an account over the first time period;

determining a first state for the IP address for the first time period and a second state for the IP address for the second time period, wherein the first state represents a value or data structure that approximates the first activity over the first time period, and wherein determining the first state is based at least in part on the probabilistic data structure;

determining a difference between the first state and the second state;

determining that the difference meets or exceeds a threshold value;

outputting, based at least in part on the difference meeting or exceeding the threshold value, third data indicating a potential malicious event included in the first activity or the second activity; and performing an action to mitigate the potential malicious event.

17. The one or more non-transitory computer-readable media of claim 16, wherein the first time period is before or after the second time period.

18. The one or more non-transitory computer-readable media of claim 16, wherein:

the first state or the second state represents one of: a first number of user accounts the IP address requested access to or at least one resource requested by the IP address, and the difference between the first state and the second state indicates a number of new accounts accessed by the IP address and a total number of resources accessed by the IP address as part of the first activity and the second activity.

* * * * *